No. 630,182. Patented Aug. 1, 1899.
A. CHINA.
BICYCLE.
(Application filed Aug. 18, 1898.)
(No Model.)
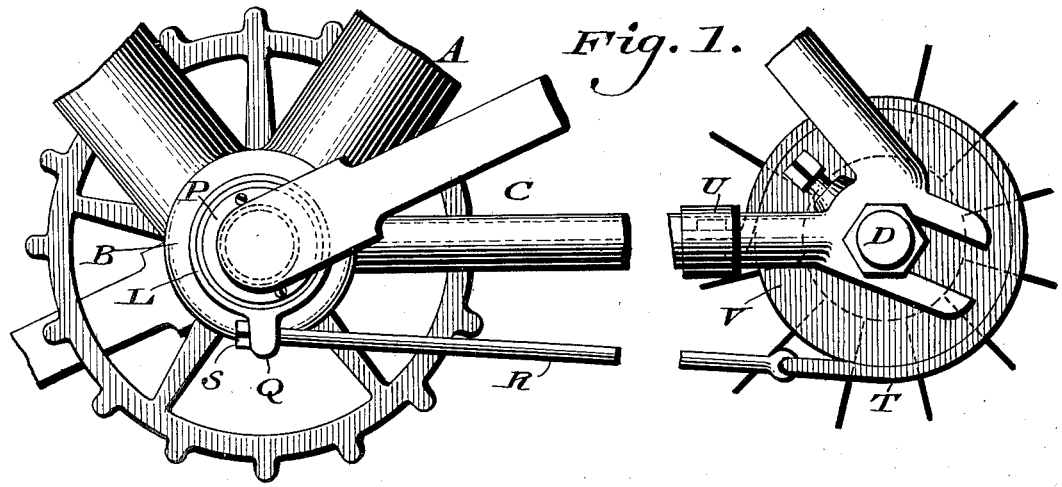
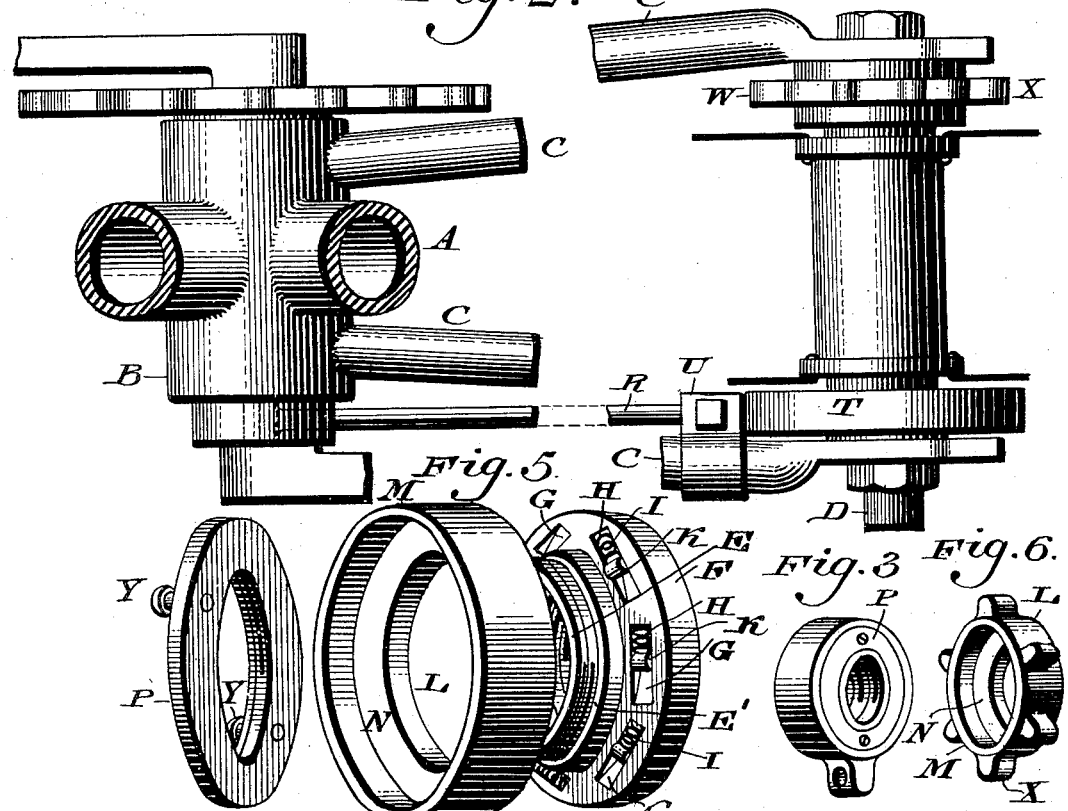
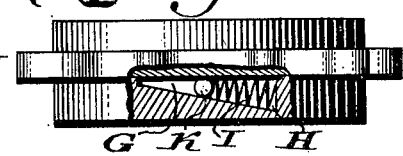

UNITED STATES PATENT OFFICE.

ARCHIE CHINA, OF SUMTER, SOUTH CAROLINA.

BICYCLE.

SPECIFICATION forming part of Letters Patent No. 630,182, dated August 1, 1899.

Application filed August 18, 1898. Serial No. 688,841. (No model.)

*To all whom it may concern:*

Be it known that I, ARCHIE CHINA, a citizen of the United States, residing in the city and county of Sumter, State of South Carolina, have invented a new and useful Improvement in Bicycles, which improvement is fully set forth in the following specification and accompanying drawings.

My invention relates to certain improvements in bicycles, and more particularly to brakes therefor, the same being designed in connection with the rear wheel of the bicycle, the object being to improve the construction of the same and so arrange the parts that during the forward movement of the pedals the brake will be kept normally out of operative position or at such times as the pedals are held against forward or backward movement, means being employed in connection with the crank-shaft and pedals whereby the brake is actuated by the feet of the rider and is at all times under his complete control and whereby also the brake mechanism may be brought into operative position and applied the instant back-pedaling is resorted to owing to the rider's control of the wheel.

The invention further contemplates the use, in connection with the axle of the rear wheel, of a clutch mechanism, to be described, adapted to coact with a loosely-mounted sprocket-wheel and give forward rotation of the wheel; but at the moment of back-pedaling or at such times as the pedals are held against rotative movement this clutch mechanism will operate to release the sprocket-wheel, so that the forward rotation of the wheel may be continued without operating the pedals, and thus permit of coasting.

My invention also consists of a novel construction of brake mechanism, as will be hereinafter described.

It further consists of novel details of construction, all as will be hereinafter fully set forth, and particularly pointed out in the claims.

Figure 1 represents a side elevation of a portion of a bicycle embodying my invention. Fig. 2 represents a plan view of the same. Fig. 3 represents a perspective view of the clutch mechanism employed. Fig. 4 represents a top view of one of the sprocket-wheels and connected clutch mechanism, partly in section, designed for use with the rear wheel. Fig. 5 represents a perspective view of the clutch with the parts separated in order that the interior construction thereof may be clearly shown. Fig. 6 represents a perspective view of the sprocket-wheel shown in Figs. 2 and 4.

Similar letters of reference indicate corresponding parts in the figures.

Referring to the drawings, A designates a portion of a bicycle-frame, the same being broken in order to draw the parts closer together, B the crank-hanger, and C the tubes or fork which extends rearwardly from the crank-hanger to the axle D of the rear wheel, wherein it is journaled. These several parts are of any usual or desired construction, and therefore need no further or detailed description.

The crank-axle or pedal-shaft at one end is provided, as usual, with the ordinary sprocket-wheel for the driving-chain, (not shown,) and at the other end it is threaded to receive the internally-threaded neck or extension E of a collar F, which latter is provided with a plurality of grooves G, arranged at convenient intervals apart within the inner face thereof. The grooves G at one end are flush with the face of the collar F, from which point they gradually taper or incline inwardly to their extreme ends, and thus form shoulders H, against which the ends of the springs I rest, the opposite ends of which springs press against suitable cylindrical rollers or balls K, to be hereinafter referred to.

L designates an annulus formed with an outer cylindrical shell M and a radial dividing-wall N, which latter is provided with a bore adapted to receive the neck or extension E of the collar F, whereon it is held against removal by the screw-ring P, which is fitted on the reduced exteriorly-threaded end of the said neck or extension E. It will be observed that by reducing the outer exterior end of the neck E, as shown, a shoulder E' is formed, against which the inner face of the screw-ring may be tightly screwed without contacting with the ring or annulus L, so that a free movement of the tube is insured, and it will also be observed that when these parts are put together, as shown in Fig. 3, the collar F and screw-ring will turn together without disturbing the annulus L, since the wall N is not as deep as the smooth part of the extension E of the collar F. The cylindrical shell of the ring or annulus L is sufficiently wide to incase or cover the collar F and the screw-ring P, as is evident from Figs. 3 and 4.

Q designates a lug or ear projecting from the periphery of the annulus D, the same having connected with it one end of a rod R, which is held therein by a nut S or other suitable retaining device, the opposite end of said rod being connected with a friction or brake strap T, fastened at its other end to a clamp U, secured to the bicycle-frame, and which is adapted to embrace a disk or drum V, secured to the axle of the rear-wheel.

The clutching mechanism W, hereinbefore referred to as used in connection with the rear wheel, is substantially the same in all its parts as that just described for use upon the crank-axle to operate the brake mechanism, except that the annulus L is provided on its periphery with the usual sprocket-teeth X, as shown in Fig. 6, to engage the driving-chain, and the operation of the parts is reversed, as will be clearly understood by the following: The collar F is secured to the rear wheel, as shown in Fig. 2, and the annulus L and screw-ring P are arranged thereon with due relation to each other, as hereinbefore described; but it will be understood that the grooves G in the face of this collar are oppositely disposed to those within the collar on the crank-axle—that is to say, the grooves in the collar upon the crank-axle gradually deepen from left to right, while those in the collar on the axle of the rear wheel deepen from right to left. Thus as the pedals are worked to give forward movement to the bicycle the chain will give the annulus of the rear clutch through the teeth thereon a forwardly-rotative movement, causing the cylindrical rollers or balls located in the grooves G to ride up the inclines thereof and so bind the collar F against the wall N of the annulus and cause all parts to revolve together and the rear wheel to be propelled forward. At the same time the cylindrical rollers or balls within the grooves G of the collar F, located on the crank-axle, will, through their frictional contact with the wall N of the annulus L, be forced into the deeper portion of the grooves and so permit of the free forward rotative movement of the crank-axle and its attached collar F and screw-ring P, the ring or annulus in this instance remaining undisturbed. When, however, a backward movement is given to the pedals, the cylindrical rollers or balls, through their frictional contact with the collar F and the wall N of the annulus L, will be drawn up the incline surfaces of the grooves, binding the same together and giving to the annulus L a rotative movement in a direction which will throw the ear Q forwardly and impart an advancing motion to the rod R, thus tightening the strap T around the periphery of the drum as a brake upon the bicycle, the effect of which is evident. The rear sprocket-wheel through the chain will at the same movement be released owing to the fact that the back-pedaling will force the cylindrical rollers or balls back again into the deeper portions of the grooves in the collar F, and thus all strain upon the chain is avoided, the wheel being then under the complete control of the rider.

It will be noticed that in both instances the collar F and screw-ring P revolve together, while the annulus L is only affected when the cylindrical rollers or balls K are moved to bind against it; but in connection with the clutch mechanism used upon the rear wheel I may employ binding devices or tightening-screws Y, which pass through the ring P and bind against the wall N of the annulus L when it is desired that the latter shall revolve positively with the collar F and ring P.

It will be seen from the foregoing that my invention is readily applicable to bicycles or other similar vehicles of any desired or usual construction, that it is strong, durable, and not liable to lateral strain, and that the parts being mainly applied to the crank-axle or pedal-shaft and the rear wheel and absolutely independent of the gearing between these parts it is obvious that it may be applied readily and effectively in connection with various kinds of gearing.

Having thus described my invention, what I claim as new, and desire to secure by Letters Patent, is—

1. In a bicycle, the combination of driving and driven members, a collar rigidly mounted upon one of said members and provided with a neck or extension, an inclined groove in the inner face of said collar, a roller or ball in said groove, an annulus consisting of an outer shell having an interior radial wall situated between the ends thereof, said annulus being connected with the other member and loosely mounted upon said collar with one face of said radial wall opposed to the inner face of said collar, and a ring upon said neck engaging the other face of said radial wall and holding said parts together, said collar and ring being situated within and incased by said outer shell.

2. In a bicycle, the combination of driving and driven members, a collar rigidly mounted upon one of said members and provided with a neck or extension through which said member extends, said neck or extension having a reduced end portion forming a shoulder at the end of said neck or extension proper, an inclined groove in the inner face of said collar, a roller or ball in said groove, an annulus consisting of an outer shell having an interior radial wall situated between the ends thereof, said annulus being connected with the other member and loosely mounted upon said collar with said radial wall surrounding the neck or extension proper and one face opposed to the inner face of the collar, the thickness of said radial wall being less than said neck or extension proper, and a ring rigidly mounted upon the reduced end portion of said neck abutting against said shoulder and holding said parts together, said collar and ring being situated within and incased by said outer shell.

3. In a bicycle, the combination of driving and driven members, a collar rigidly mounted upon one of said members and provided with a neck or extension, an inclined groove in the inner face of said collar, a roller or ball in said groove, an annulus consisting of an outer shell having an interior radial wall situated between the ends thereof, said annulus being connected with the other member and loosely mounted upon said collar with one face of said radial wall opposed to the inner face of said collar, a ring upon said neck engaging the other face of said radial wall and holding said parts together, and binding devices carried by said ring to engage said radial wall to hold the collar and annulus against relative movement, said collar and ring being situated within and incased by said outer shell.

4. The combination in a bicycle or other vehicle of a collar having a threaded neck or extension adapted to be secured to the hub of the rear wheel and having a groove in its face, a cylindrical roller or ball arranged in said groove, a spring also located in said groove, an annulus loosely mounted on said collar and provided with sprocket-teeth, a screw-ring to retain the said annulus in place and tightening-screws arranged in said screw-ring adapted to engage the annulus so that the parts may revolve together.

ARCHIE CHINA.

Witnesses:
D. CHINA,
CHAS. S. KINGSMAN.